(12) United States Patent
Kondrk et al.

(10) Patent No.: US 9,406,068 B2
(45) Date of Patent: Aug. 2, 2016

(54) METHOD AND SYSTEM FOR SUBMITTING MEDIA FOR NETWORK-BASED PURCHASE AND DISTRIBUTION

(75) Inventors: Robert H. Kondrk, Mountain View, CA (US); Timothy Benjamin Martin, Mountain View, CA (US); Jeffrey L. Robbin, Los Altos, CA (US); David Heller, San Jose, CA (US); Mike Wiese, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 2557 days.

(21) Appl. No.: 10/687,534

(22) Filed: Oct. 15, 2003

(65) Prior Publication Data

US 2004/0254883 A1    Dec. 16, 2004

Related U.S. Application Data

(60) Provisional application No. 60/465,410, filed on Apr. 25, 2003.

(51) Int. Cl.

| | |
|---|---|
| G06F 21/00 | (2013.01) |
| G06Q 20/42 | (2012.01) |
| G06Q 20/04 | (2012.01) |
| G06Q 20/12 | (2012.01) |
| G06Q 20/22 | (2012.01) |
| G06Q 20/24 | (2012.01) |
| G06Q 20/34 | (2012.01) |
| G06Q 30/06 | (2012.01) |
| H04L 29/06 | (2006.01) |

(Continued)

(52) U.S. Cl.
CPC ............... *G06Q 20/42* (2013.01); *G06Q 20/04* (2013.01); *G06Q 20/12* (2013.01); *G06Q 20/123* (2013.01); *G06Q 20/1235* (2013.01); *G06Q 20/227* (2013.01); *G06Q 20/24* (2013.01); *G06Q 20/35785* (2013.01); *G06Q 30/06* (2013.01); *G06Q 30/0601* (2013.01); *G06Q 40/12* (2013.12); *H04L 29/06* (2013.01); *H04L 67/322* (2013.01); *H04L 69/329* (2013.01)

(58) Field of Classification Search
None
See application file for complete search history.

(56) References Cited

U.S. PATENT DOCUMENTS

| | | |
|---|---|---|
| 4,750,119 A | 6/1988 | Cohen et al. |
| 4,960,981 A | 10/1990 | Benton |

(Continued)

FOREIGN PATENT DOCUMENTS

| | | |
|---|---|---|
| EP | 0725376 | 8/1996 |
| EP | 0927945 | 7/1999 |

(Continued)

OTHER PUBLICATIONS

"MPEG-7 Multimedia Description Schemes XM (Version 2.0)", ISO/IEC, Mar. 2000, pp. 1-138.

(Continued)

*Primary Examiner* — Fateh M Obaid
(74) *Attorney, Agent, or Firm* — Nicholas Panno; DLA Piper LLP US

(57) ABSTRACT

Methods and systems for submitting media to a media distribution site are disclosed. The submission of media to the media distribution site is able to be performed by numerous submitters in a uniform and computer-assisted manner. The submitted media can then be encoded in a largely automated manner at the media distribution site into a suitable digital form and then made available for online purchase and distribution.

46 Claims, 10 Drawing Sheets

(51) Int. Cl.
  *H04L 29/08* (2006.01)
  *G06Q 40/00* (2012.01)

(56) References Cited

U.S. PATENT DOCUMENTS

| | | | |
|---|---|---|---|
| 5,253,165 A | 10/1993 | Leiseca et al. | |
| 5,410,598 A | 4/1995 | Shear | |
| 5,485,518 A | 1/1996 | Hunter et al. | |
| 5,535,383 A | 7/1996 | Gower | |
| 5,627,973 A | 5/1997 | Armstrong et al. | |
| 5,635,978 A | 6/1997 | Alten et al. | |
| 5,680,323 A | 10/1997 | Barnard | |
| 5,706,507 A | 1/1998 | Schloss | |
| 5,715,403 A | 2/1998 | Stefik | |
| 5,719,789 A | 2/1998 | Kawamata | |
| 5,752,128 A | 5/1998 | Yamashita | |
| 5,765,152 A | 6/1998 | Erickson | |
| 5,845,260 A | 12/1998 | Nakano et al. | |
| 5,864,830 A | 1/1999 | Armetta et al. | |
| 5,864,868 A | 1/1999 | Contois | |
| 5,884,280 A | 3/1999 | Yoshioka et al. | |
| 5,943,422 A | 8/1999 | Van Wie et al. | |
| 5,953,710 A | 9/1999 | Fleming | |
| 5,963,915 A | 10/1999 | Kirsch | |
| 5,963,916 A | 10/1999 | Kaplan | |
| 5,987,466 A | 11/1999 | Greer et al. | |
| 6,011,537 A | 1/2000 | Slotznick | |
| 6,044,360 A | 3/2000 | Picciallo et al. | |
| 6,067,531 A | 5/2000 | Hoyt et al. | |
| 6,085,253 A * | 7/2000 | Blackwell et al. | 709/235 |
| 6,151,643 A | 11/2000 | Cheng | |
| 6,173,269 B1 | 1/2001 | Soloki et al. | |
| 6,226,618 B1 * | 5/2001 | Downs et al. | 705/1 |
| 6,232,973 B1 | 5/2001 | Dow et al. | |
| 6,233,682 B1 | 5/2001 | Fritsch | |
| 6,236,971 B1 | 5/2001 | Stefik et al. | |
| 6,248,946 B1 | 6/2001 | Dwek | |
| 6,263,313 B1 | 7/2001 | Milsted | |
| 6,275,954 B1 | 8/2001 | Herman et al. | |
| 6,317,784 B1 | 11/2001 | Makintosh et al. | |
| 6,330,670 B1 | 12/2001 | England et al. | |
| 6,338,044 B1 | 1/2002 | Cook et al. | |
| 6,341,353 B1 | 1/2002 | Herman et al. | |
| 6,345,256 B1 | 2/2002 | Milsted et al. | |
| 6,346,951 B1 | 2/2002 | Mastronardi | |
| 6,363,486 B1 | 3/2002 | Knapton | |
| 6,363,488 B1 | 3/2002 | Ginter et al. | |
| 6,385,596 B1 * | 5/2002 | Wiser et al. | 705/51 |
| 6,389,592 B1 | 5/2002 | Ayres et al. | |
| 6,418,421 B1 | 7/2002 | Hurtado et al. | |
| 6,421,733 B1 | 7/2002 | Tso et al. | |
| 6,446,080 B1 | 9/2002 | Van Ryzin et al. | |
| 6,452,609 B1 | 9/2002 | Katinsky et al. | |
| 6,546,555 B1 | 4/2003 | Hjelsvold et al. | |
| 6,549,922 B1 | 4/2003 | Srivastava et al. | |
| 6,587,837 B1 | 7/2003 | Spagna et al. | |
| 6,590,595 B1 | 7/2003 | Wagner et al. | |
| 6,591,420 B1 | 7/2003 | McPherson et al. | |
| 6,658,476 B1 | 12/2003 | Van | |
| 6,691,149 B1 | 2/2004 | Yokota et al. | |
| 6,731,312 B2 | 5/2004 | Robbin | |
| 6,754,895 B1 | 6/2004 | Bartel et al. | |
| 6,760,721 B1 * | 7/2004 | Chasen et al. | 707/3 |
| 6,779,115 B1 | 8/2004 | Naim | |
| 6,873,992 B1 | 3/2005 | Thomas | |
| 6,874,003 B2 * | 3/2005 | Morohashi | 707/204 |
| 6,910,049 B2 | 6/2005 | Fenton et al. | |
| 6,938,005 B2 | 8/2005 | Iverson et al. | |
| 6,941,324 B2 | 9/2005 | Plastina et al. | |
| 6,959,326 B1 | 10/2005 | Day et al. | |
| 6,976,229 B1 | 12/2005 | Balabanovic et al. | |
| 6,976,265 B1 | 12/2005 | Yang et al. | |
| 7,006,993 B1 | 2/2006 | Cheong et al. | |
| 7,010,512 B1 | 3/2006 | Gillin | |
| 7,020,704 B1 | 3/2006 | Lipscomb et al. | |
| 7,054,888 B2 | 5/2006 | LaChapelle et al. | |
| 7,062,468 B2 | 6/2006 | Hillegass et al. | |
| 7,073,193 B2 * | 7/2006 | Marsh | 725/114 |
| 7,076,445 B1 | 7/2006 | Cartwright | |
| 7,143,064 B2 | 11/2006 | Picciallo et al. | |
| 7,168,012 B2 | 1/2007 | Clauss et al. | |
| 7,206,748 B1 | 4/2007 | Gruse et al. | |
| 7,209,892 B1 * | 4/2007 | Galuten et al. | 705/26 |
| 7,219,308 B2 | 5/2007 | Novak et al. | |
| 7,228,437 B2 | 6/2007 | Spagna et al. | |
| 7,269,564 B1 | 9/2007 | Milsted et al. | |
| 7,275,243 B2 | 9/2007 | Gibbons et al. | |
| 7,292,980 B1 | 11/2007 | August et al. | |
| 7,293,275 B1 | 11/2007 | Krieger et al. | |
| 7,308,413 B1 | 12/2007 | Tota et al. | |
| 7,340,451 B2 | 3/2008 | Sacco | |
| 7,345,234 B2 | 3/2008 | Plastina et al. | |
| 7,358,434 B2 | 4/2008 | Plastina et al. | |
| 7,383,233 B1 | 6/2008 | Singh et al. | |
| 7,549,129 B2 | 6/2009 | Sheldon | |
| 7,624,046 B2 | 11/2009 | Galuten et al. | |
| 7,685,512 B2 | 3/2010 | Hanson et al. | |
| 7,729,946 B2 | 6/2010 | Chu | |
| 7,739,256 B2 | 6/2010 | Powell | |
| 7,756,920 B2 | 7/2010 | Muller et al. | |
| 7,797,242 B2 | 9/2010 | Gautier et al. | |
| 7,827,162 B2 | 11/2010 | Suitts et al. | |
| 7,844,548 B2 | 11/2010 | Robbin et al. | |
| 7,853,480 B2 | 12/2010 | Taylor | |
| 7,860,830 B2 | 12/2010 | Mirrashidi et al. | |
| 7,962,634 B2 | 6/2011 | Cortes et al. | |
| 7,987,510 B2 | 7/2011 | Kocher et al. | |
| 8,015,237 B2 | 9/2011 | Muller et al. | |
| 8,095,858 B2 | 1/2012 | Peters | |
| 8,161,411 B2 | 4/2012 | Robbin et al. | |
| 2001/0018858 A1 | 9/2001 | Dwek | |
| 2001/0021926 A1 | 9/2001 | Schneck et al. | |
| 2001/0033296 A1 | 10/2001 | Fullerton et al. | |
| 2001/0034703 A1 | 10/2001 | Picciallo et al. | |
| 2001/0037207 A1 | 11/2001 | Dejaeger | |
| 2001/0040658 A1 | 11/2001 | Nemoto et al. | |
| 2001/0042002 A1 | 11/2001 | Koopersmith | |
| 2001/0044786 A1 | 11/2001 | Ishibashi | |
| 2001/0054046 A1 | 12/2001 | Mikhailov et al. | |
| 2002/0002468 A1 | 1/2002 | Geisler et al. | |
| 2002/0002541 A1 | 1/2002 | Williams | |
| 2002/0002609 A1 | 1/2002 | Chung | |
| 2002/0004824 A1 | 1/2002 | Cuan et al. | |
| 2002/0010740 A1 | 1/2002 | Kikuchi et al. | |
| 2002/0016776 A1 | 2/2002 | Chu et al. | |
| 2002/0026575 A1 | 2/2002 | Wheeler et al. | |
| 2002/0032658 A1 | 3/2002 | Oki et al. | |
| 2002/0033844 A1 | 3/2002 | Levy et al. | |
| 2002/0042730 A1 | 4/2002 | Homer | |
| 2002/0047899 A1 | 4/2002 | Son et al. | |
| 2002/0049804 A1 | 4/2002 | Rodriguez et al. | |
| 2002/0049844 A1 * | 4/2002 | Nishikawa | 709/225 |
| 2002/0062252 A1 | 5/2002 | Van Zoest et al. | |
| 2002/0065781 A1 | 5/2002 | Hillegass et al. | |
| 2002/0073167 A1 | 6/2002 | Powell et al. | |
| 2002/0073177 A1 | 6/2002 | Clark et al. | |
| 2002/0077986 A1 | 6/2002 | Kobata et al. | |
| 2002/0078211 A1 | 6/2002 | Natarajan et al. | |
| 2002/0082857 A1 | 6/2002 | Skordin et al. | |
| 2002/0087440 A1 | 7/2002 | Blair et al. | |
| 2002/0091584 A1 | 7/2002 | Clark et al. | |
| 2002/0091634 A1 | 7/2002 | Eubanks | |
| 2002/0095386 A1 | 7/2002 | Maritzen et al. | |
| 2002/0099661 A1 | 7/2002 | Kii et al. | |
| 2002/0099696 A1 | 7/2002 | Prince | |
| 2002/0099801 A1 * | 7/2002 | Ishii | 709/219 |
| 2002/0104096 A1 | 8/2002 | Cramer et al. | |
| 2002/0107803 A1 | 8/2002 | Lisanke et al. | |
| 2002/0112171 A1 | 8/2002 | Ginter et al. | |
| 2002/0116293 A1 | 8/2002 | Lao et al. | |
| 2002/0118300 A1 | 8/2002 | Middleton et al. | |
| 2002/0124182 A1 | 9/2002 | Bacso et al. | |
| 2002/0138439 A1 | 9/2002 | Matsushima et al. | |
| 2002/0143612 A1 | 10/2002 | Barik et al. | |

(56) References Cited

U.S. PATENT DOCUMENTS

| | | |
|---|---|---|
| 2002/0143782 A1 | 10/2002 | Headings et al. |
| 2002/0152267 A1 | 10/2002 | Lennon |
| 2002/0152278 A1 | 10/2002 | Pontenzone et al. |
| 2002/0165811 A1* | 11/2002 | Ishii et al. ............... 705/36 |
| 2002/0165821 A1 | 11/2002 | Tree |
| 2002/0174021 A1 | 11/2002 | Chu et al. |
| 2002/0186844 A1 | 12/2002 | Levy et al. |
| 2002/0194195 A1 | 12/2002 | Fenton et al. |
| 2002/0198843 A1 | 12/2002 | Wang et al. |
| 2003/0005173 A1 | 1/2003 | Shah et al. |
| 2003/0014496 A1 | 1/2003 | Spencer et al. |
| 2003/0014630 A1 | 1/2003 | Spencer et al. |
| 2003/0020671 A1 | 1/2003 | Santoro et al. |
| 2003/0021283 A1 | 1/2003 | See et al. |
| 2003/0029914 A1 | 2/2003 | Hortman et al. |
| 2003/0033162 A1 | 2/2003 | Houssiaux et al. |
| 2003/0037242 A1 | 2/2003 | Yasuna et al. |
| 2003/0046224 A1 | 3/2003 | Mujtaba |
| 2003/0049014 A1 | 3/2003 | Siddiqui |
| 2003/0065717 A1 | 4/2003 | Saito et al. |
| 2003/0074465 A1* | 4/2003 | Tang et al. ............... 709/237 |
| 2003/0079038 A1 | 4/2003 | Robbin et al. |
| 2003/0079120 A1 | 4/2003 | Hearn et al. |
| 2003/0093340 A1 | 5/2003 | Krystek et al. |
| 2003/0097331 A1 | 5/2003 | Cohen |
| 2003/0115144 A1 | 6/2003 | Stefik et al. |
| 2003/0120593 A1 | 6/2003 | Bansai et al. |
| 2003/0120928 A1 | 6/2003 | Cato et al. |
| 2003/0126432 A1 | 7/2003 | Tonisson |
| 2003/0135424 A1* | 7/2003 | Davis et al. ............... 705/26 |
| 2003/0135464 A1 | 7/2003 | Mourad et al. |
| 2003/0140114 A1 | 7/2003 | Katz et al. |
| 2003/0149720 A1 | 8/2003 | Goldstein |
| 2003/0149742 A1 | 8/2003 | Bollerud |
| 2003/0163399 A1 | 8/2003 | Harper et al. |
| 2003/0167318 A1 | 9/2003 | Robbin et al. |
| 2003/0182139 A1 | 9/2003 | Harris et al. |
| 2003/0182188 A1 | 9/2003 | Duchow |
| 2003/0191776 A1 | 10/2003 | Obrador |
| 2003/0195863 A1 | 10/2003 | Marsh |
| 2003/0208473 A1 | 11/2003 | Lennon |
| 2003/0226150 A1 | 12/2003 | Berberet et al. |
| 2003/0236886 A1 | 12/2003 | Oren et al. |
| 2004/0003097 A1 | 1/2004 | Willis et al. |
| 2004/0012618 A1 | 1/2004 | Finney |
| 2004/0015427 A1* | 1/2004 | Camelio ............... 705/35 |
| 2004/0015445 A1 | 1/2004 | Heaven |
| 2004/0025185 A1 | 2/2004 | Goci et al. |
| 2004/0034601 A1 | 2/2004 | Kreuzer |
| 2004/0039754 A1 | 2/2004 | Harple |
| 2004/0044949 A1 | 3/2004 | Rowe |
| 2004/0059929 A1 | 3/2004 | Rodgers et al. |
| 2004/0064807 A1 | 4/2004 | Rose et al. |
| 2004/0093274 A1 | 5/2004 | Vanska et al. |
| 2004/0101287 A1 | 5/2004 | Seo et al. |
| 2004/0103120 A1 | 5/2004 | Fickle et al. |
| 2004/0123725 A1 | 7/2004 | Kim |
| 2004/0133605 A1 | 7/2004 | Chang et al. |
| 2004/0133794 A1 | 7/2004 | Kocher et al. |
| 2004/0136698 A1 | 7/2004 | Mock et al. |
| 2004/0143760 A1 | 7/2004 | Alkove et al. |
| 2004/0148358 A1 | 7/2004 | Singh et al. |
| 2004/0148598 A1 | 7/2004 | Kita et al. |
| 2004/0153968 A1 | 8/2004 | Ching et al. |
| 2004/0167858 A1 | 8/2004 | Erickson |
| 2004/0181459 A1 | 9/2004 | Wright |
| 2004/0194100 A1 | 9/2004 | Nakayama et al. |
| 2004/0205028 A1 | 10/2004 | Verosub et al. |
| 2004/0210481 A1 | 10/2004 | Quinlan et al. |
| 2004/0215733 A1 | 10/2004 | Gondhalekar et al. |
| 2004/0216036 A1 | 10/2004 | Chu |
| 2004/0236957 A1 | 11/2004 | Durand et al. |
| 2004/0243482 A1 | 12/2004 | Laut |
| 2004/0254883 A1 | 12/2004 | Kondrk et al. |
| 2004/0254949 A1 | 12/2004 | Amirthalingam |
| 2004/0267552 A1 | 12/2004 | Gilliam et al. |
| 2004/0267608 A1 | 12/2004 | Mansfield, Jr. |
| 2004/0267812 A1 | 12/2004 | Harris et al. |
| 2004/0268400 A1 | 12/2004 | Barde et al. |
| 2004/0268451 A1 | 12/2004 | Robbin et al. |
| 2005/0015765 A1 | 1/2005 | Covell et al. |
| 2005/0015807 A1 | 1/2005 | Young |
| 2005/0021478 A1 | 1/2005 | Gautier et al. |
| 2005/0034164 A1 | 2/2005 | Sano et al. |
| 2005/0038813 A1 | 2/2005 | Apparao et al. |
| 2005/0044524 A1 | 2/2005 | Murray et al. |
| 2005/0050218 A1 | 3/2005 | Sheldon et al. |
| 2005/0050345 A1 | 3/2005 | Dowdy et al. |
| 2005/0055718 A1 | 3/2005 | Stone |
| 2005/0060264 A1 | 3/2005 | Schrock et al. |
| 2005/0071418 A1 | 3/2005 | Kjellberg et al. |
| 2005/0071780 A1 | 3/2005 | Muller et al. |
| 2005/0080743 A1 | 4/2005 | Ostrover et al. |
| 2005/0080788 A1 | 4/2005 | Murata |
| 2005/0091302 A1 | 4/2005 | Soin et al. |
| 2005/0144635 A1 | 6/2005 | Boortz |
| 2005/0149340 A1 | 7/2005 | Murakami et al. |
| 2005/0149392 A1 | 7/2005 | Gold et al. |
| 2005/0165656 A1 | 7/2005 | Frederick et al. |
| 2005/0182792 A1 | 8/2005 | Israel et al. |
| 2005/0193094 A1 | 9/2005 | Robbin et al. |
| 2005/0197946 A1 | 9/2005 | Williams et al. |
| 2005/0203959 A1 | 9/2005 | Muller et al. |
| 2005/0210509 A1 | 9/2005 | Jones |
| 2005/0216472 A1 | 9/2005 | Leon et al. |
| 2005/0232227 A1 | 10/2005 | Jorgenson et al. |
| 2005/0240529 A1 | 10/2005 | Thomas |
| 2005/0240661 A1 | 10/2005 | Heller et al. |
| 2005/0246159 A1 | 11/2005 | Perla et al. |
| 2005/0246193 A1 | 11/2005 | Roever et al. |
| 2005/0267894 A1 | 12/2005 | Camahan |
| 2005/0268279 A1 | 12/2005 | Paulsen et al. |
| 2005/0273849 A1 | 12/2005 | Araujo et al. |
| 2005/0278375 A1 | 12/2005 | Mitchko et al. |
| 2005/0283394 A1 | 12/2005 | McGloin et al. |
| 2006/0008256 A1 | 1/2006 | Khedouri et al. |
| 2006/0015489 A1 | 1/2006 | Probst et al. |
| 2006/0026284 A1 | 2/2006 | Nguyen |
| 2006/0041748 A1 | 2/2006 | Lockhart et al. |
| 2006/0048132 A1 | 3/2006 | Chen et al. |
| 2006/0059097 A1 | 3/2006 | Kent |
| 2006/0062426 A1 | 3/2006 | Levy et al. |
| 2006/0074754 A1 | 4/2006 | Toyohara et al. |
| 2006/0091203 A1 | 5/2006 | Bakker et al. |
| 2006/0100978 A1 | 5/2006 | Heller et al. |
| 2006/0107046 A1 | 5/2006 | Raley et al. |
| 2006/0112101 A1 | 5/2006 | Young |
| 2006/0123052 A1 | 6/2006 | Robbin et al. |
| 2006/0143264 A1 | 6/2006 | Payne |
| 2006/0160622 A1 | 7/2006 | Lee et al. |
| 2006/0161604 A1 | 7/2006 | Lobo |
| 2006/0167751 A1 | 7/2006 | Maruyama |
| 2006/0167816 A1 | 7/2006 | Wang et al. |
| 2006/0168123 A1 | 7/2006 | Krstulich |
| 2006/0195462 A1 | 8/2006 | Rogers |
| 2006/0212722 A1 | 9/2006 | Ginter et al. |
| 2006/0229929 A1 | 10/2006 | Hughes |
| 2006/0242640 A1 | 10/2006 | Pauly |
| 2006/0256130 A1 | 11/2006 | Gonzalez |
| 2006/0265409 A1 | 11/2006 | Neumann et al. |
| 2006/0272026 A1 | 11/2006 | Niwano et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0038567 A1 | 2/2007 | Allaire et al. |
| 2007/0050467 A1 | 3/2007 | Borrett et al. |
| 2007/0073694 A1 | 3/2007 | Picault et al. |
| 2007/0083471 A1 | 4/2007 | Robbin et al. |
| 2007/0093958 A1 | 4/2007 | Jonsson et al. |
| 2007/0106522 A1 | 5/2007 | Collins |

(56) References Cited

U.S. PATENT DOCUMENTS

| | | |
|---|---|---|
| 2007/0108274 A1 | 5/2007 | Boardman et al. |
| 2007/0118475 A1 | 5/2007 | Picciallo et al. |
| 2007/0166687 A1 | 7/2007 | Bell |
| 2007/0192352 A1 | 8/2007 | Levy |
| 2007/0208670 A1 | 9/2007 | Quoc |
| 2007/0220051 A1 | 9/2007 | Brentano et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2007/0288864 A1 | 12/2007 | Keereepart et al. |
| 2008/0040379 A1 | 2/2008 | Suitts et al. |
| 2008/0065782 A1 | 3/2008 | Jones |
| 2008/0071614 A1 | 3/2008 | Mebruer |
| 2008/0077850 A1 | 3/2008 | Gauthier et al. |
| 2008/0120199 A1 | 5/2008 | Pirnack et al. |
| 2008/0133594 A1 | 6/2008 | Fotinatos et al. |
| 2008/0140493 A1 | 6/2008 | DeAngelis |
| 2008/0140537 A1 | 6/2008 | Powell |
| 2008/0147530 A1 | 6/2008 | Kwan et al. |
| 2008/0147558 A1 | 6/2008 | Kraus |
| 2008/0155552 A1 | 6/2008 | Kim |
| 2008/0168355 A1 | 7/2008 | Dunlap et al. |
| 2008/0195651 A1 | 8/2008 | Rachmiel et al. |
| 2008/0249946 A1 | 10/2008 | Candelore |
| 2008/0288405 A1 | 11/2008 | John |
| 2008/0301058 A1 | 12/2008 | Campbell et al. |
| 2009/0037287 A1 | 2/2009 | Baitalmel et al. |
| 2009/0063543 A1 | 3/2009 | Martin et al. |
| 2009/0138117 A1 | 5/2009 | Bagwell et al. |
| 2009/0181655 A1 | 7/2009 | Wallance et al. |
| 2009/0198830 A1 | 8/2009 | Zhang et al. |
| 2009/0240552 A1 | 9/2009 | Yang |
| 2009/0259502 A1 | 10/2009 | Erlewine et al. |
| 2009/0260060 A1 | 10/2009 | Smith et al. |
| 2009/0276332 A1 | 11/2009 | Gharabally et al. |
| 2009/0276333 A1 | 11/2009 | Cortes et al. |
| 2009/0276433 A1 | 11/2009 | Fosback et al. |
| 2009/0307201 A1 | 12/2009 | Dunning et al. |
| 2009/0307682 A1 | 12/2009 | Gharabally |
| 2009/0307683 A1 | 12/2009 | Gharabally |
| 2010/0114739 A1 | 5/2010 | Johnston |
| 2010/0115443 A1 | 5/2010 | Richstein |
| 2010/0205274 A1 | 8/2010 | Gharabally et al. |
| 2010/0235254 A1 | 9/2010 | Chu et al. |
| 2010/0235889 A1 | 9/2010 | Chu et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2011/0035579 A1 | 2/2011 | Miura et al. |
| 2011/0040658 A1 | 2/2011 | Robbin et al. |
| 2011/0060776 A1 | 3/2011 | Suitts et al. |
| 2011/0197285 A1 | 8/2011 | Ginter et al. |
| 2012/0023015 A1 | 1/2012 | Mathai et al. |
| 2012/0110317 A1 | 5/2012 | Scheer et al. |

FOREIGN PATENT DOCUMENTS

| | | |
|---|---|---|
| EP | 1111562 | 6/2001 |
| EP | 1 684 223 A1 | 7/2006 |
| EP | 2 230 620 A1 | 9/2010 |
| FR | 2827981 | 1/2003 |
| JP | 2002-328852 | 1/1900 |
| JP | 11-161717 | 6/1999 |
| JP | 2001-202088 | 7/2001 |
| JP | A 2002-041482 | 2/2002 |
| JP | 2002-099466 | 4/2002 |
| JP | 2002-108881 | 4/2002 |
| JP | 2002-116933 | 4/2002 |
| JP | 2002-123640 | 4/2002 |
| JP | 2002-164880 | 6/2002 |
| JP | 2002-318873 | 10/2002 |
| JP | 2002-541528 | 12/2002 |
| JP | 2003-050745 | 2/2003 |
| JP | 2003-526805 | 9/2003 |
| JP | 2006-519637 | 8/2006 |
| JP | A 2006-272000 | 10/2006 |
| JP | A 2007-220062 | 8/2007 |
| JP | A 2008-142548 | 6/2008 |
| JP | A 2009-048340 | 3/2009 |
| WO | WO 97/04410 | 2/1997 |
| WO | WO 98/49644 | 11/1998 |
| WO | WO9927681 | 6/1999 |
| WO | WO 00/08909 | 2/2000 |
| WO | WO0028461 | 5/2000 |
| WO | WO0031744 | 6/2000 |
| WO | WO0043852 | 7/2000 |
| WO | WO0043904 | 7/2000 |
| WO | WO0043905 | 7/2000 |
| WO | WO0062265 | 10/2000 |
| WO | WO0141023 | 6/2001 |
| WO | WO0144908 | 6/2001 |
| WO | WO0146786 | 6/2001 |
| WO | WO0150305 | 7/2001 |
| WO | WO0165526 | 9/2001 |
| WO | WO0208869 | 1/2002 |
| WO | WO 02/48920 | 6/2002 |
| WO | WO02084444 | 10/2002 |
| WO | WO03017213 | 2/2003 |
| WO | WO03023786 | 3/2003 |
| WO | WO 2004/019182 A2 | 3/2004 |

OTHER PUBLICATIONS

U.S. Appl. No. 11/786,031 entitled Media Package Formate for Submission to a Media Distribution System, filed Apr. 9, 2007.

U.S. Appl. No. 11/946,711 entitled "Resubmission of Media for Network-Based Distribution", filed Nov. 28, 2007.

"Liquifier Pro 4.0 for Windows™ User's Guide," 1998, Liquid Audio, Inc.

Vartiainen et al. "Auto-updated", Proceedings of the 4th International Conference on Mobile Technology, Applications, and Systems and the 1st International Symposium on Computer Human Interaction in Mobile Technology, Mobility '07, Jan. 1, 2007, p. 683.

"Digital Audio Best Practices Version 2.1", by Digital Audio Working Group, Oct. 2006, http:/www.mndigital.org.digitizing/standards/audio.pdf.

Lai et al., "Preservation Digitization of David Edelberg's Handel LP Collection", Music Technology, Facility of Music McGill University, Montreal, Canada, 2005.

Venkataramu, "Analysis and Enhancement of Apple's Fairplay Digital Rights Management", Department of Computer Science, San Jose State University, May 2007.

Radified Guide to Ripping & Encoding CD Audio, http://mp3.radified.com, downloaded Oct. 7, 2003, pp. 1-5.

"Music Collector Features," Collectorz.com music collector features, http://www.collectorz.com/music/features.php, downloaded Oct. 7, 2003, pp. 1-2.

"Gracenote CDDB," Gracenote, product webpage, http://www.gracenote.com/gn_products/cddb.html, downloaded Oct. 7, 2003, pp. 1-2.

"Gracenote MusicID," Gracenote, product webpage, http://www.gracenote.com/gn_products/music_id.html, downloaded Oct. 7, 2003, pp. 1-2.

"AVCataloger Overview," NC Software, Inc. http://www.avcataloger.com/Products.aspx, downloaded Oct. 6, 2003, pp. 1-4.

Jyri Huopaniemi, "Music Encoding and Transmission," CUIDAD meeting, ICMC '2000 Berlin, Aug. 28, 2000.

"Media Encoding FAQ," Loudeye Corp., http://www.loudeye.com/digitalmedia/solutions/mediaenchost/encodingfaq.asp, downloaded Oct. 9, 2003, pp. 1-3.

"Media encoding datasheet," Loudeye Corp., http://www.loudeye.com/digitalmedia/solutions/mediaenchost/encoding.asp, downloaded Oct. 9, 2003, pp. 1-4.

"Media hosting datasheet," Loudeye Corp. http://www.loudeye.com/digitalmedia/solutions/mediaenchost/hosting.asp, downloaded Oct. 9, 2003, pp. 1-2.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

(56) References Cited

OTHER PUBLICATIONS

Sonopress Global Network User Manual, Client Tools, Upload Data/ Graphics Files to Sonopress, Sonopress, date unknown.
Liquifier Pro 4.0 for Windows User's Guide, Liquid Audio, Inc., Nov. 20, 1998.
Curtis et al "Metadata—The Key to Content Management Services" IEEE 1999 <source:http://www.ee.ucl.ac.uk/~fstentif/curtis.htm>.
"The iTunes Music Store. Downloads Done Right", www.apple.com/music/store, downloaded Sep. 24, 3003, pp. 1-3.
"Shop the First Online 99C Store", www.apple.com/music/store/shop.html, downloaded Sep. 24, 2003, pp. 1-2.
Bhatnagar, "Gift Cards: Charged for the Holidays", CNNMoney, Oct. 23, 2003, pp. 1-3.
Marks, "A Cyber Mall Where the Kids Stay Supervised", Business Week, Jul. 28, 2000, pp. 1-2.
Wang, "Cybermalls Fit for a Kid Teens can Shop on their own at these new websites. But do they rock?", CNNMoney.com, Nov. 1, 19999, pp. 1-3.
Winters, "Electronic Allowances", Time, Inc., Nov. 15, 1999, pp. 1-3.
"Get 'em when they're young", Multichannel Merchant, http://multichannelmerchant.com/new/marketing_em_theyre_young/, Apr. 1, 1999, pp. 1-3.
iCanBuy.com, website closing screen shot, Sep. 12, 2001, pp. 1-2.
"iCanBuy.com Announces Seven New Retail Partners: New Partnerships Include Major Online Sites, Reflecting iCanBuy's Leadership in Safety and Privacy", Business Wire, Jul. 29, 1999, pp. 1-5.
Magid, "PocketCard Keeps Teen Charges in Check at the Mall", Los Angeles Times, www.pcanswer.com/articles/pocketcard.htm., Oct. 5, 1999, pp. 1-4.
Jason Nieh and Monica S. Lam, "A SMART Scheduler for Multimedia Applications", ACM Transactions on Computer Systems, vol. 21, No. 2, May 2003, pp. 117-163.
David B. Golub, "Operating System Support for Coexistence of Real-Time and Conventional Scheduling", Nov. 3, 1994.
Jason Nieh and Monica S. Lam, "The Design, Implementation and Evaluation of SMART: A Scheduler for Multimedia Applications", Proceedings of the Sixteenth ACM Symposium on Operating Systems Principles, St. Malo, France (Oct. 1997).
Strunk et al., "The Elements of Style", Third Edition, 1979, Mac Millan Publ. Co., Inc., New York, NY, all pages.
Burton, "Elementary Number Theory", Fourth Edition, 1998, The McGraw-Hill Companies, Inc., all pages.
Derfler, "How Networks Work", Bestseller Edition, 1996, Ziff-Davis Press, Emeryville, CA, all pages.
White, "How Computers Work", Millennium Edition, 1999, Que Corporation, Indianapolis, IN, all pages.
Gralla, "How the Internet Works", Millennium Edition, 1999, Que Corporation, Indianapolis, IN, all pages.
Muller, "Desktop Encyclopedia of the Internet", 1999, Artech House Inc., Norwood, MA, all pages.
Shirai, Kazu, Mac People Beginners. vol. 5, ASCII Corporation, Japan, Apr. 1, 2001, vol. 5, pp. 52-59.
Nomura, "Complete Guide for Using Software and Peripherals", 1st edition, Ohmsha, ltd.

\* cited by examiner

```
<?xml version="1.0" encoding="UTF-8"?>
<package>
    <major_version>1</major_version>
    <minor_version>1</minor_version>
    <tool_name>iTunes Producer</tool_name>
    <tool_version>1.0b1</tool_version>
    <provider>Label Name</provider>
    <album>
        <album_upc>000000000000</album_upc>
        <album_title>Playlist No. 1 Title</album_title>
        <album_release_date>2003-09-23</album_release_date>
        <album_original_release_year>2003</album_original_release_year>
        <album_label_name>Label Name</album_label_name>
        <album_genres>
            <genre>Rock</genre>
            <genre>Alternative</genre>
        </album_genres>
        <album_copyright_cline>2003 Label Name</album_copyright_cline>
        <album_copyright_pline>2003 Label Name</album_copyright_pline>
        <album_artwork_files>
            <file>
                <file_name>Cover.jpg</file_name>
                <checksum type="md5">7934F59CD683D51A11FAC9A077CBECF9</checksum>
            </file>
        </album_artwork_files>
        <album_display_artist>Artist Name</album_display_artist>
        <album_products>
            <product>
                <sales_start_date>2003-09-23</sales_start_date>
            </product>
        </album_products>
        <album_tracks>
            <track>
                <track_isrc>CA1234567890</track_isrc>
                <track_title>Track One Title</track_title>
                <track_genres>
                    <genre>Rock</genre>
                    <genre>Alternative</genre>
                </track_genres>
                <track_volume_number>1</track_volume_number>
                <track_volume_count>1</track_volume_count>
                <track_track_number>1</track_track_number>
                <track_track_count>8</track_track_count>
                <track_audio_file>
                    <file_name>Track-One-Title.m4a</file_name>
                    <checksum type="md5">83D9D2E9E941814C0C1991026EF7B9C7</checksum>
                </track_audio_file>
```

FIG. 9

METHOD AND SYSTEM FOR SUBMITTING MEDIA FOR NETWORK-BASED PURCHASE AND DISTRIBUTION

CROSS-REFERENCE TO RELATED APPLICATION

This application claims the benefit of U.S. Provisional Patent Application No. 60/465,410, filed Apr. 25, 2003, and entitled "METHOD AND SYSTEM FOR SECURE NETWORK-BASED DISTRIBUTION OF MEDIA," and which is hereby incorporated by reference herein.

This application is related to commonly owned U.S. patent application Ser. No. 10/766 403, filed Feb. 10, 2004, and entitled "METHOD AND SYSTEM FOR NETWORK-BASED PURCHASE AND DISTRIBUTION OF MEDIA."

BACKGROUND OF THE INVENTION

1. Field of the Invention

The present invention relates to electronic transmission of media and, more particularly, to electronic submission of media for purposes of media purchase and distribution.

2. Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years, music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

Today, various online media hosting sites permit virtual visitors to purchase and download albums or songs via the Internet (e.g., World Wide Web). However, in order for the albums or songs to be offered for purchase and download, the electronic content for the albums or songs must first be provided to the media hosting sites. Conventionally, a music label desirous of selling audio productions of their songs online would produce a tape or CD and then physically mail the tape or CD to a representative for the media hosting site. Typically, a submission would include not only the audio productions of songs but also text and images associated with the songs. The text provides descriptive information (e.g., metadata) for the songs and the images pertain to associated artwork (e.g., cover art). More recently, music labels have electronically transmitted the audio production of their songs to a representative of the media hosting site. Unfortunately, there are various different means and formats by which various music labels submit their audio productions of songs and associated data. This problem is exacerbated by the large number of small music labels that make submissions. As a result, representatives of the media hosting site that receive the submissions face substantial burdens and difficulties due to the wide range of variation with respect to the submissions.

Thus, there is a need for improved approaches to submit media to an online media hosting site.

SUMMARY OF THE INVENTION

Broadly speaking, the invention relates to an improved system and method for submitting media to a media distribution site. The submission of media to the media distribution site is able to be performed by numerous submitters in a uniform and computer-assisted manner. The submitted media can then be encoded in a largely automated manner at the media distribution site into a suitable digital form and then made available for online purchase and distribution.

The invention can be implemented in numerous ways, including as a method, system, device, apparatus, graphical user interface, or computer readable medium. Several embodiments of the invention are discussed below.

As a method for submission of a media collection to a media distribution site, one embodiment of the invention includes at least the acts of: obtaining metadata for the media collection; identifying media content for a plurality of media items to be included in the media collection, the media content being imported from a media source; converting the identified media content for the plurality of media items into compressed media files; obtaining metadata for the identified media content; forming an electronic package of the media collection, the electronic package including at least the compressed media files and the metadata associated with the media collection and the identified media content; and electronically transmitting the electronic package to the media distribution site.

As a computer readable medium including at least computer program code for submission of a media collection to a media distribution site, one embodiment of the computer readable medium includes at least: computer program code for identifying media content for a plurality of media items to be included in the media collection, the media content being imported from a media source; computer program code for converting the identified media content for the plurality of media items into compressed media files; computer program code for obtaining metadata for the identified media content; computer program code for forming an electronic package of the media collection, the electronic package including at least the compressed media files and the metadata associated with the identified media content; and computer program code for electronically transmitting the electronic package to the media distribution site.

As a graphical user interface for submitting a media collection to a media distribution site, one embodiment of the invention includes at least: a media collection information window used to receive media collection information; an import window used to designate media items to be imported from one or more media sources; and a media content information window used to receive media content information pertaining to the designated media items.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 9 is a screenshot of a representative text file in a markup language format according to one embodiment of the invention.

DETAILED DESCRIPTION OF THE INVENTION

The invention relates to an improved system and method for submitting media to a media distribution site. The submission of media to the media distribution site is able to be performed by numerous submitters in a uniform and computer-assisted manner. The submitted media can then be encoded in a largely automated manner at the media distribution site into a suitable digital form and then made available for online purchase and distribution. The media distribution site can also be referred to as an online media hosting site.

The invention pertains to a method and system for controlled submission of media in a client-server environment. The controlled submission can use encryption and user accounts to restrict unauthorized access. The media can, for example, be audio, video, or image data.

Embodiments of various aspects of the invention are discussed below with reference to FIGS. 1-9. However, those skilled in the art will readily appreciate that the detailed description given herein with respect to these figures is for explanatory purposes as the invention extends beyond these limited embodiments.

Figure 1:
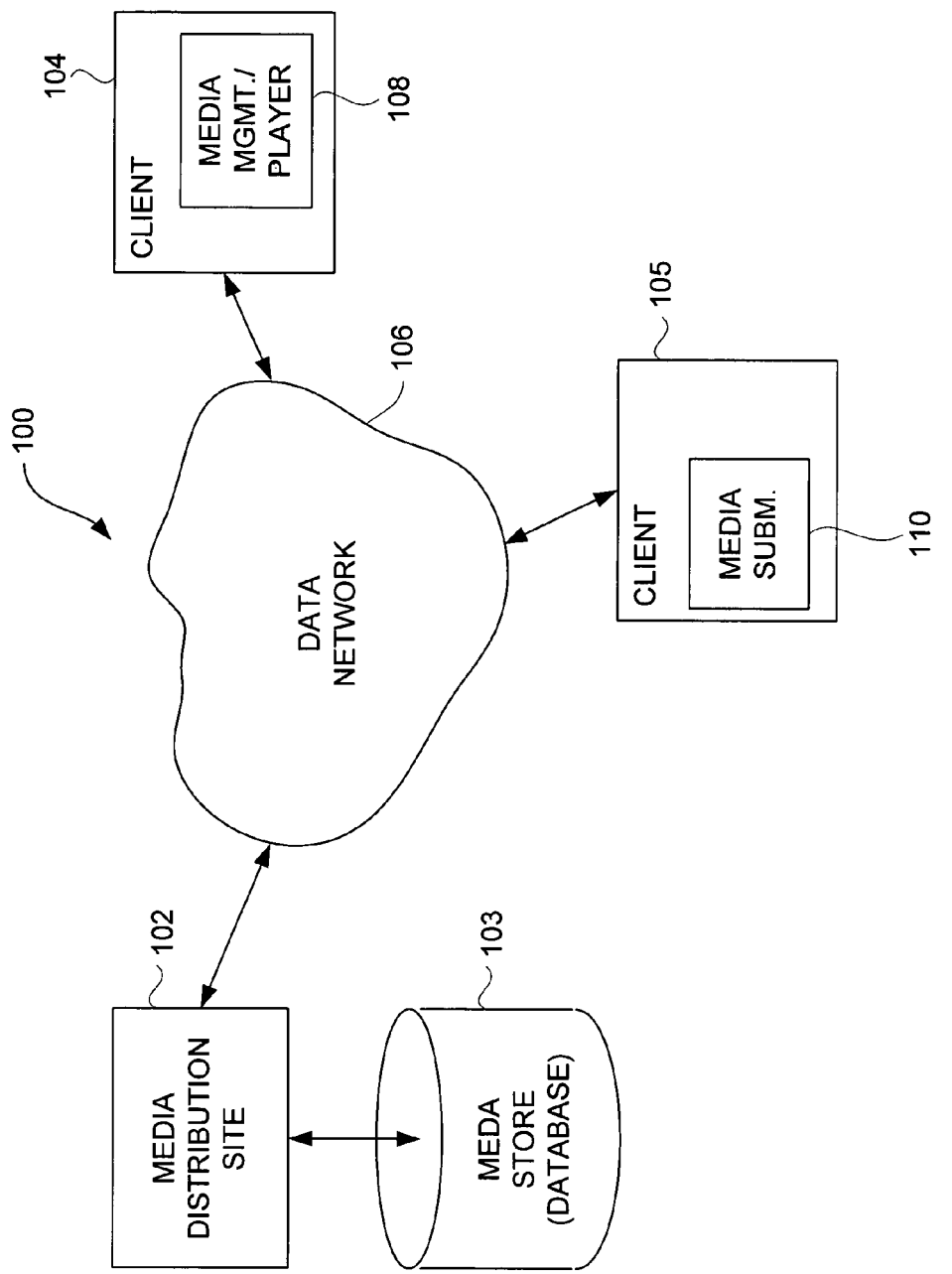
FIG. 1 is a block diagram of a media submission and distribution system according to one embodiment of the invention.

FIG. 1 is a block diagram of a media submission and distribution system 100 according to one embodiment of the invention. The media submission and distribution system 100 includes a media distribution site 102. The media distribution site 102 coordinates submission (receipt), storage and purchase of media items. The media distribution site 102 stores media items in a media store 103. In one embodiment, the media store 103 is a database. The media store 103 provides mass storage of the numerous media items that are available for purchase. Once purchased, the media items can be accessed from the media store 103 over a data network 106 by way of the media distribution site 102.

The media submission and distribution system 100 also includes a first client 104 and a second client 105. Typically, the media submission and distribution system 100 would include a plurality of different clients 104, 105. The first client 104 includes a media management/player 108. The second client 105 includes a media submission program 110. Some clients can also include both the media management/player 108 and the media submission program 110. The media management/player 108 is an application program (e.g., software application) that operates on the first client 104, which is a computing device. One example of a suitable media management/player 108 is iTunes™ offered by Apple Computer, Inc. The first client 104 is coupled to the media distribution site 102 through the data network 106. Hence, any of the first clients 104 can interact with the media distribution site 102 to review, purchase and/or manage media items.

The media submission program 110 is also an application program (e.g., software application) that operates on the second client 105, which is a computing device. The media submission program 110 is used to submit media items to the media distribution site 102. Although the media management/player 108 and the media submission program 110 are shown in FIG. 1 as separate programs, it should be understood that such programs can be integrated into a single program or reside on the same second client.

In the media submission and distribution system 100 shown in FIG. 1, the media items are submitted to the media distribution site 102 by way of the media submission program 110. The media items that have been submitted (e.g., via the second client 105) are processed and then stored in the media store 103. Thereafter, the stored media item are available to be purchased from the media distribution site 102. Upon purchasing a particular media item, the media distribution site 102 permits the media content for the particular media item to be retrieved from the media store 103 and then delivered (e.g., downloaded) from the media distribution site 102 to the corresponding client 104 through the data network 106. In this regard, the media distribution site 102 obtains the media content corresponding to the particular media item from the media store 103 and downloads such content through the data network 106 to the client 104. The downloaded media content can then be stored on the client 104. In one embodiment, the downloaded media content is encrypted as received at the client 104 but is decrypted and then perhaps re-encrypted before persistent storage on the client 104. Thereafter, the media management/player 108 can present (e.g., play) the media content at the client 104.

The media submission and distribution system 100 allows a user of the client 104 to utilize the media player 108 to browse, search or sort through a plurality of media items that can be purchased from the media distribution site 102. The media management/player 108 may also allow the user to preview a media clip of the media items. In the event that the user of the media management/player 108 desires to purchase a particular media item, the user (via the media management/player 108) and the media distribution site 102 can engage in an online commerce transaction in which the user pays for access rights to the particular media item. In one embodiment, a credit card associated with the user is credited for the purchase amount of the particular media item.

The submission and purchase of the media items can be achieved over a data network 106. In other words, the submission and purchase of the media items can be achieved online. The purchase of media items online can also be referred to as electronic commerce (e-commerce). In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The connections through the data network 106 between the media distribution server 102 and the clients 104, 105 can be through secure connections, such as Secure Sockets Layer (SSL). Further, the media content can be re-encrypted prior to storage at the client 104 such that downloaded media content is not stored in the clear, but is instead stored in an encrypted manner.

Figure 2:
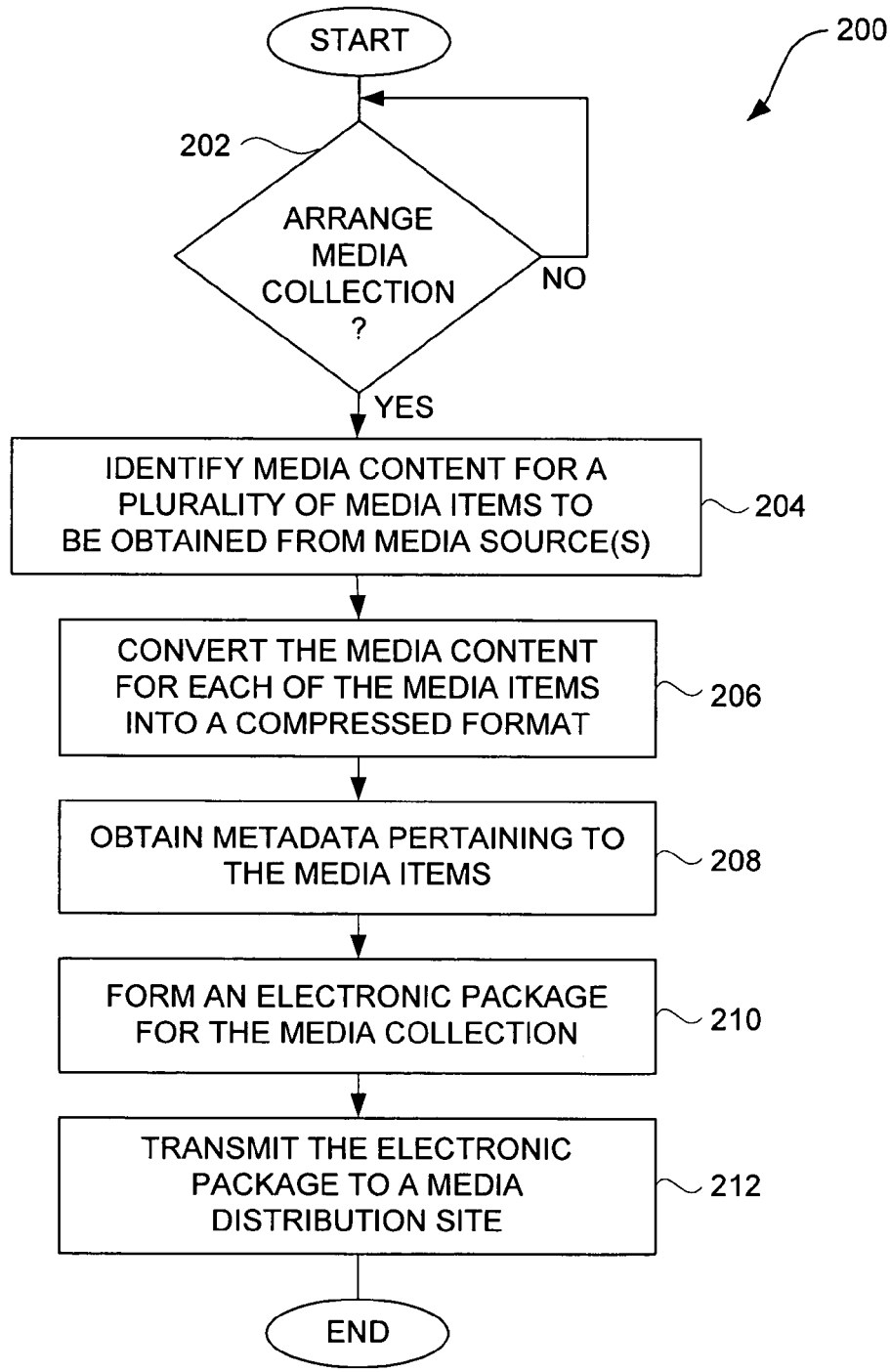
FIG. 2 is a flow diagram of a media submission process according to one embodiment of the invention.

FIG. 2 is a flow diagram of a media submission process 200 according to one embodiment of the invention. The media submission process 200 is typically performed by a client machine, such as the client 105 illustrated in FIG. 1. More particularly, the media submission program 110 at the client 105 illustrated in FIG. 1 can perform the media submission process 200.

The media submission process 200 begins with a decision 202 that determines whether a media collection is to be arranged for submission from a client machine to a server machine (e.g., media distribution site). When the decision 202 determines that a media collection is not to be arranged for submission at this time, then the media submission process 200 awaits a request to arrange a media collection. In other words, the media submission process 200 can be invoked whenever a request to arrange a media collection is received. Typically, a user of the client machine would interact with the client machine (e.g., the media submission program 110) to initiate a request to arrange a media collection.

In any case, once the decision 202 determines that a media collection is to be arranged, media content for a plurality of media items are identified. The identified media content for the media items is to be included within the media collection being arranged. Typically, the media content for these media items is retrieved from one or more media sources. Examples of media sources are compact discs (CDs) or media files. After the media content has been identified 204, the media content for each of the media items is converted 206 into a compressed format. Here, in the case of compact discs, the stored data is in a format that is not suitable for transmission over networks. Hence, typically, the format of the media content from compact disc is converted into a compressed format that is suitable for transmission through networks. Examples of compressed formats for audio files include Advanced Audio Coding (MC), MPEG (e.g., MPEG4), MP3 and M4 files.

Next, metadata pertaining to the media items is obtained 208. In one embodiment, the metadata for the media items includes descriptive information regarding the media items. The metadata is, in one embodiment, provided by a user through interaction with the client machine (e.g., the media submission program 110).

Thereafter, an electronic package is formed 210 for the media collection. The electronic package is, for example, an electronic folder that includes a plurality of files. The plurality of files within the electronic folder include a file for the media content (in its compressed format) for each of the media items, folder metadata, and possibly other files. Here, the folder metadata can include not only the metadata for the media items, but also other metadata pertaining to the media collection and/or the organization of the electronic folder and components within the electronic folder. An example of one type of other file would be a file of an image that is to be associated with the media collection. The image, for example, can pertain to artwork to be utilized in association with the media collection. After the electronic package has been formed 210, the electronic package can be transmitted 212 to a media distribution site (e.g., server) for online purchase and distribution. The transmission 212 of the electronic package to the media distribution site concludes the media submission process 200.

Advantageously, the electronic packages being formed and transmitted to a media distribution site can have a standard format and arrangement. As a result, the media distribution site is able to process the incoming electronic packages in an automated manner.

Many users of the media submission process 200 can be affiliated with small recording labels or artists that desire to submit their media collections to media distribution sites so that such media collections can be offered for purchase at the media distribution sites. The standardization and uniformity provided by the media submission process 200 significantly reduces the burdens and difficulties otherwise placed on the media distribution sites.

Figure 3A:
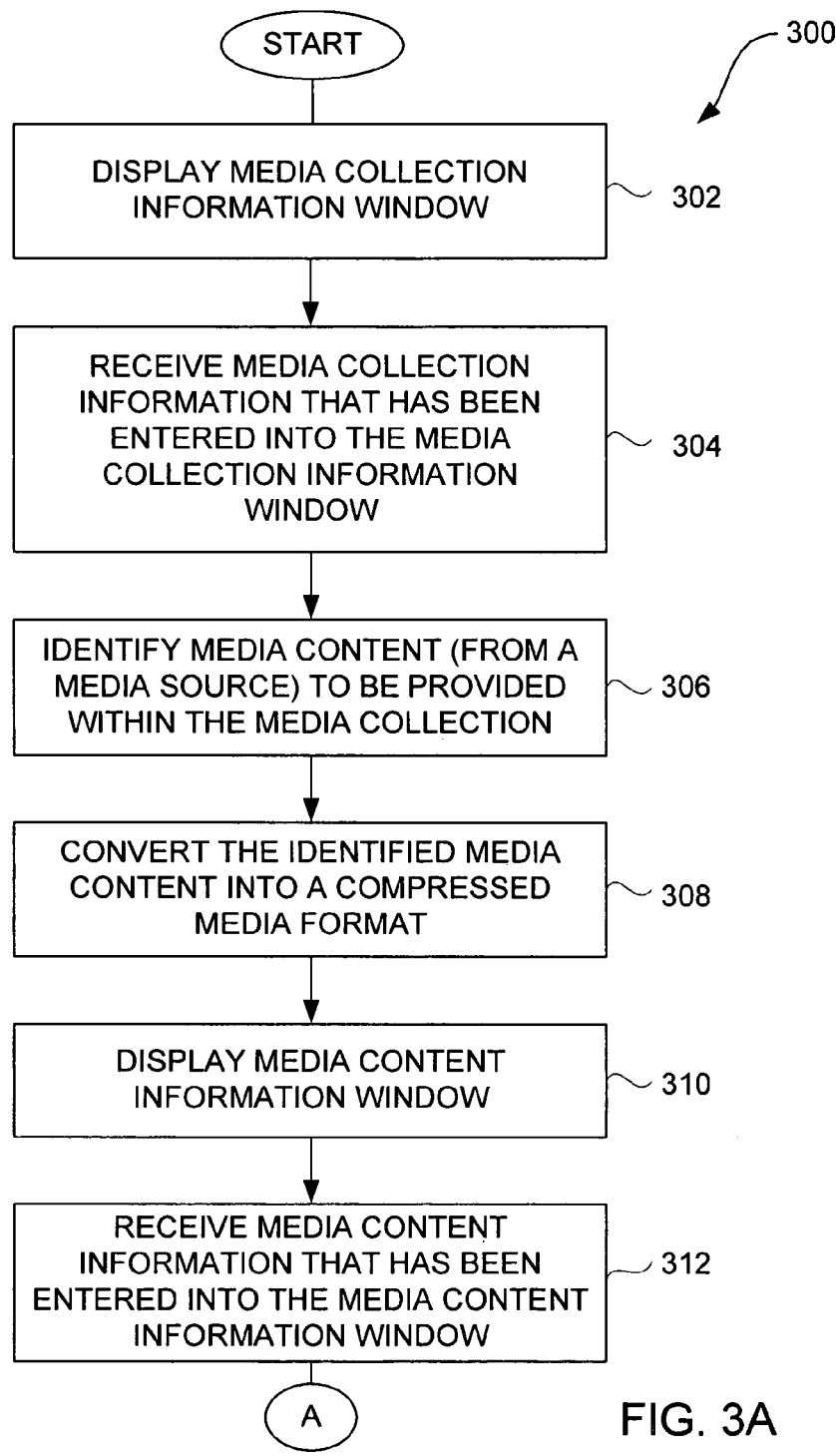
FIGS. 3A and 3B are flow diagrams of a media submission process according to another embodiment of the invention.
Figure 3B:
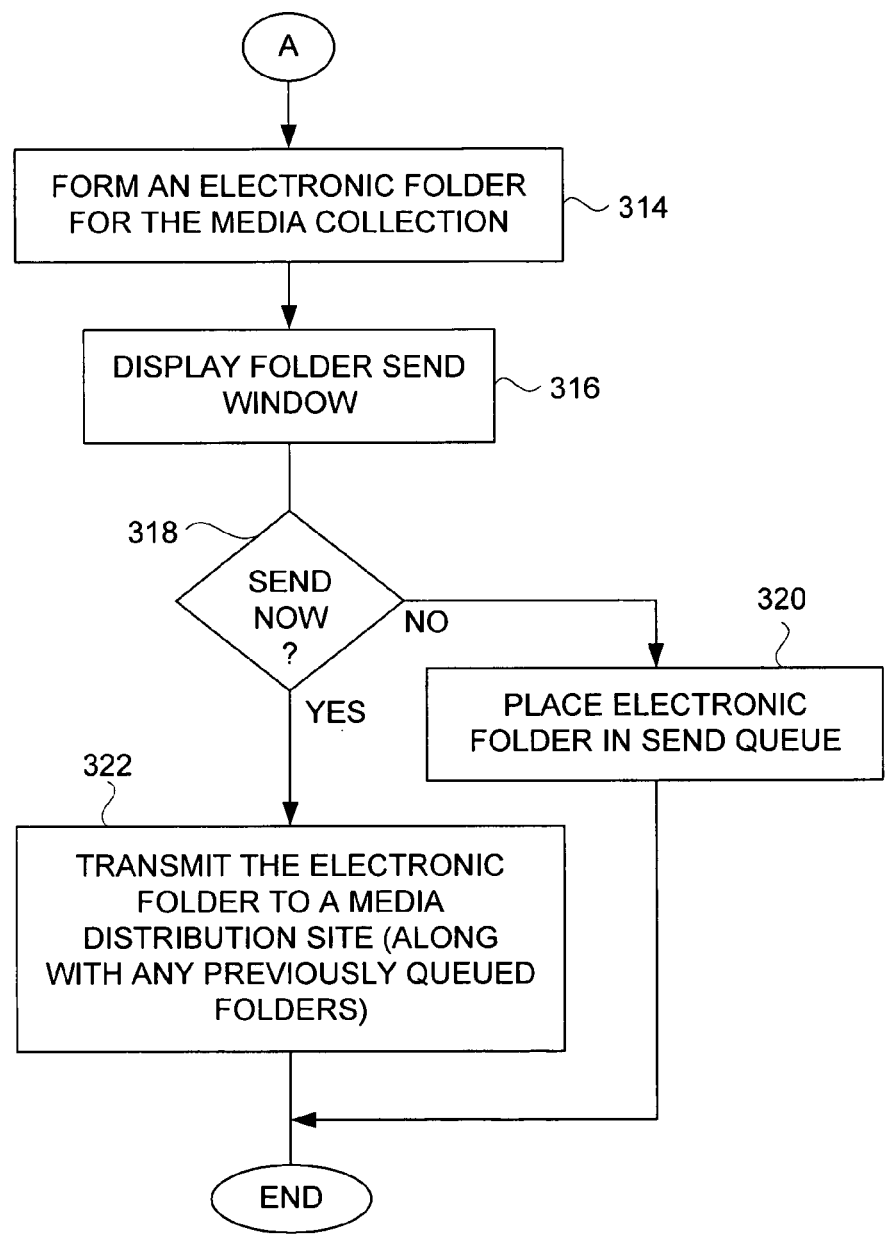

FIGS. 3A and 3B are flow diagrams of a media submission process 300 according to another embodiment of the invention. The media submission process 300 is typically performed by a client machine, such as the client 105 illustrated in FIG. 1. More particularly, the media submission program 110 at the client 105 illustrated in FIG. 1 can perform the media submission process 300.

The media submission process 300 initially displays 302 a media collection information window. Then, media collection information that has been entered into the media collection information window can be received 304. Here, the media submission process 300 receives 304 the media collection information that is entered into media collection information window by a user of the client machine (e.g., user of the media submission program 110). A representative media collection information window according to one embodiment of the invention is discussed below with reference to FIG. 4.

Next, media content for media items to be provided within the media collection is identified 306. The media content being identified 306 represents that portion of the available media content from one or more media sources that is to be provided within the media collection. Examples of media sources are compact discs (CDs) or media files. In one implementation, to assist a user with the identification 306 of the media content for the media items, an import window can be displayed. The import window would assist the user with the identification of media items/media content to be included within the media collection. A representative import window according to one embodiment of the invention is discussed below with reference to FIG. 5.

After the media content has been identified 306, the identified media content is converted 308 into a compressed media format. Here, the conversion 308 can be considered to encode the media content from a media source into a digital format suitable for electronic transmission and playing (such as MP3, M4, AAC, etc.). Encoding, in this context, refers to the process by which traditional forms of audio (e.g., compact disc) and video (e.g., VHS) are converted into a digital format that allows their distribution and broadcast over a network (e.g., the Internet).

Next, a media content information window is displayed 310. The media content information window assists the user to provide media content information regarding one or more of the media items. After the media content information window is displayed 310, media content information that has been entered into the media content information window is received 312. Here, the media submission process 300 receives 312 the media content information that is entered into media content information window by the user of the client machine (e.g., user of the media submission program 110). A representative media content information window according to one embodiment of the invention is discussed below with reference to FIG. 6.

After the media content information that has been entered into the media content information window has been received 312, an electronic folder for the media collection is formed 314. The electronic folder includes a plurality of different files, typically some of which are different data types. For example, the media content for each media item within the media collection is provided as a digital media file (e.g., MPEG4 format), and the media collection information and the media content information are provided within a text file (e.g., markup language file, such as an XML file). The text file can also provide a description of the electronic folder that specifies the media and other files within the electronic folder as well as the media collection information and the media content information. If the text file identifies artwork for the media collection or the media items, then the text file specifies an image file (e.g., JPEG format) provided within the electronic folder that contains the artwork image.

Next, a folder send window is displayed 316. The folder send window assists the user in providing user indicia prior to submission of the media collection to the media distribution site. In one implementation, the user indicia is an account identifier and a password. A representative folder send window according to one embodiment of the invention is discussed below with reference to FIG. 7.

After the user indicia has been provided via the folder send window, a decision 318 determines whether the electronic folder is to be sent (i.e., submitted) at this time. Here, the user can decide whether the electronic folder should be submitted at this time. For example, the user can choose whether the electronic folder should be submitted at this time using the folder send window.

When the decision 318 determines that the electronic folder should not be submitted at this time, then the electronic folder is placed 320 in a send queue. Once placed in the send queue, the electronic folder is stored at the client machine until such time as the electronic folder is eventually sent. On the other hand, when the decision 318 determines that the electronic folder should be sent, then the electronic folder is transmitted 322 to the media distribution site. Additionally, if other media collections were earlier queued by the media submission process 300, then any previously queued folders could also be sent to the media distribution site. Following the blocks 320 or 322, the media submission process 300 is complete and ends.

Figure 4:
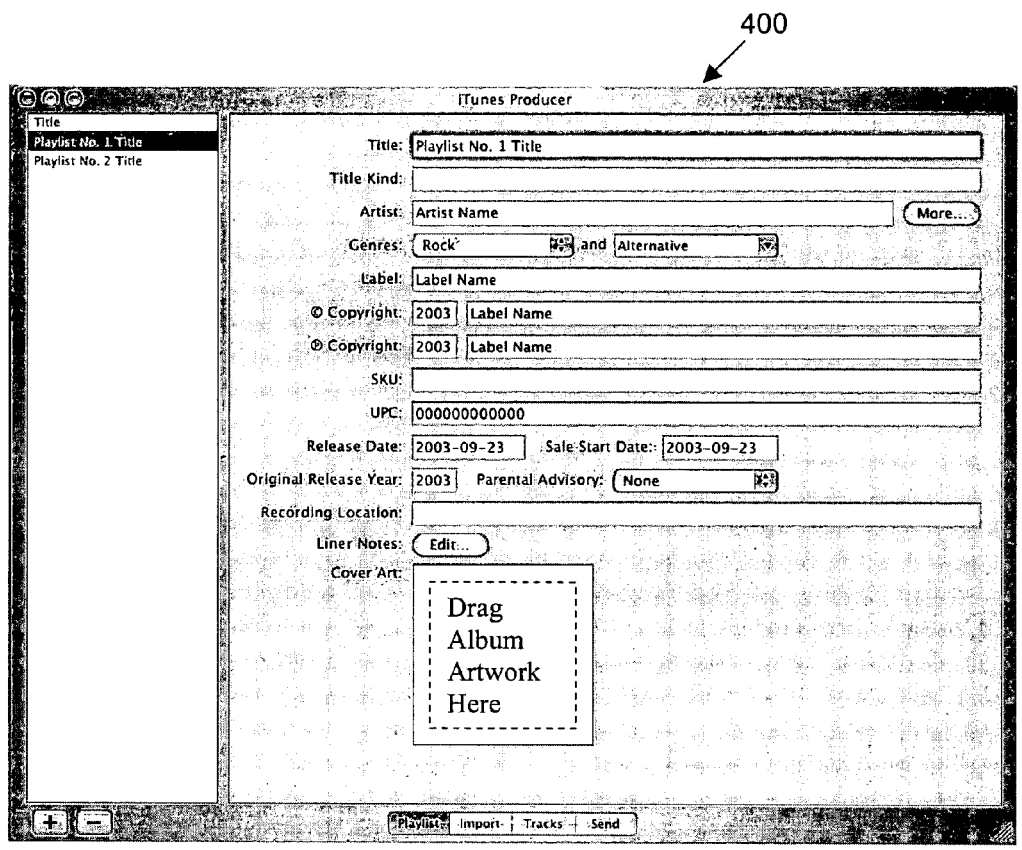
FIG. 4 is a screenshot of a representative media collection information window according to one embodiment of the invention.

FIG. 4 is a screenshot of a representative media collection information window 400 according to one embodiment of the invention. A user can interact with the media collection information window 400 to enter the media collection information. Using the media collection information window 400, media collection information, such as title, title kind (e.g., live, remix, etc.), artist, genre, label (i.e., music label), copyright, SKU, UPC, release date, sale start date, original release year, parental advisory, recording location, liner notes, and cover art, can be provided. As shown in FIG. 4, the media collection information window 400 has several fields completed, which contain media collection information.

Figure 5:
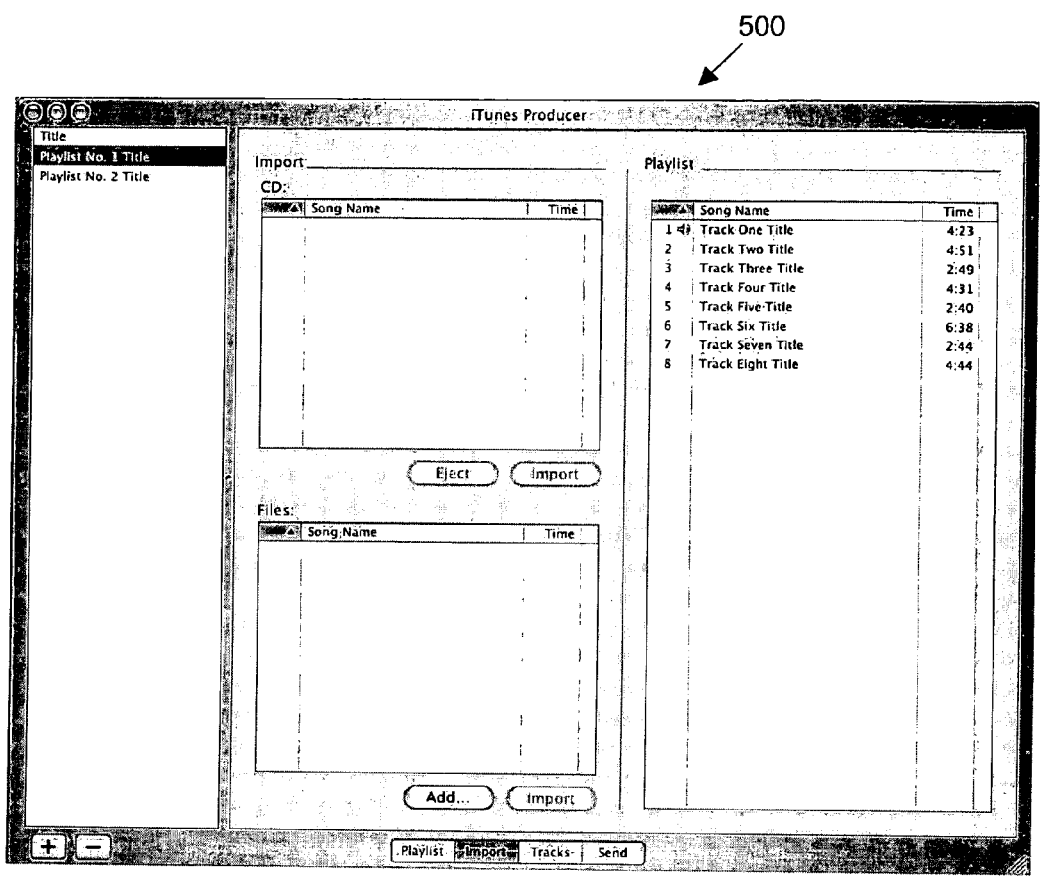
FIG. 5 is a screenshot of a representative import window according to one embodiment of the invention.

FIG. 5 is a screenshot of a representative import window 500 according to one embodiment of the invention. The import window assists a user with importing media items from media sources. Here, for the media collection "Playlist No.1 Title", eight (8) media items (i.e., tracks) have been designated for import from import sources denoted "CD" or "Files." The media collection is referred to as a playlist.

Figure 6:
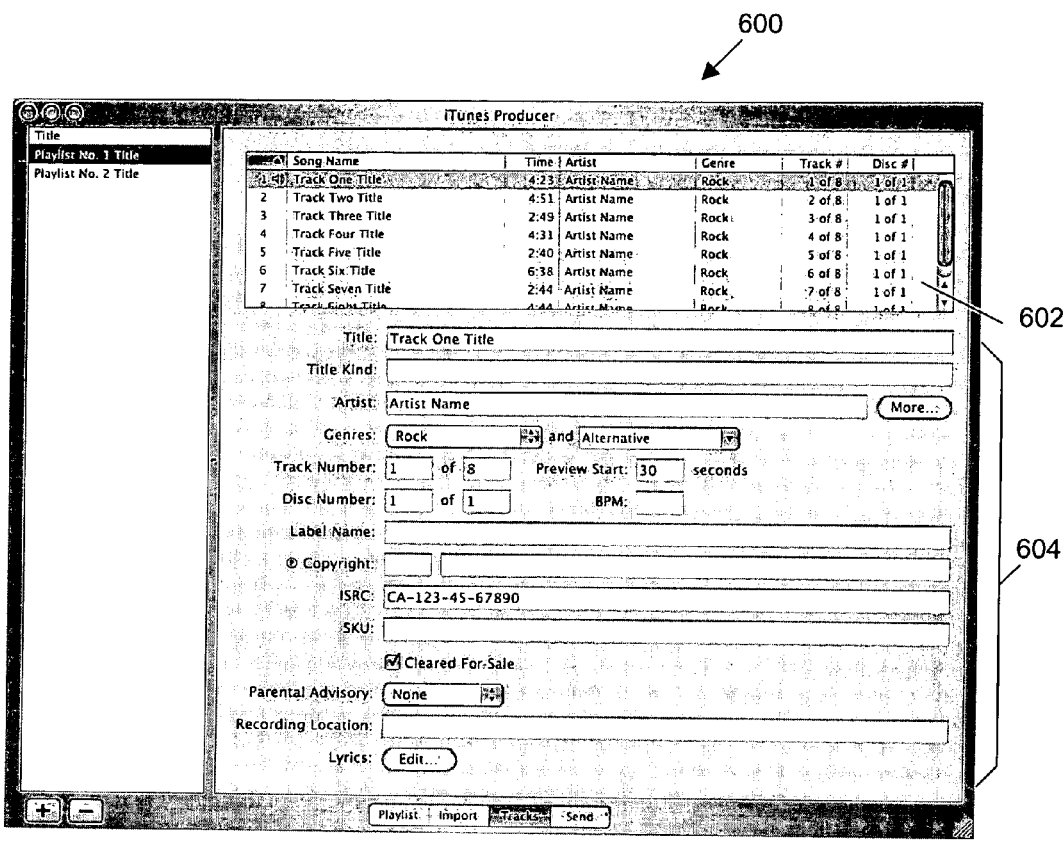
FIG. 6 is a screenshot of a representative media content information window according to one embodiment of the invention.

FIG. 6 is a screenshot of a representative media content information window 600 according to one embodiment of the invention. The representative media content information window 600 displays the media items in an upper area 602 and provides a lower area 604 for a user to enter the media content information pertaining to specific ones of the media items. The media items (i.e., tracks) shown in the upper region 602 correspond to the media items that were imported (see FIG. 5). Upon selecting one of the media items in the upper area, the media content information to be associated with such media item can then be entered in the lower area 604 which provides text entry fields. As shown in FIG. 6, the media content information for a particular media item can include such information as: title, title kind, artist, genres, track number, preview start, disk number, BPM, label name, copyright, ISRC, SKU, availability for sale indicator, parental advisory, recording location, and lyrics.

Figure 7:
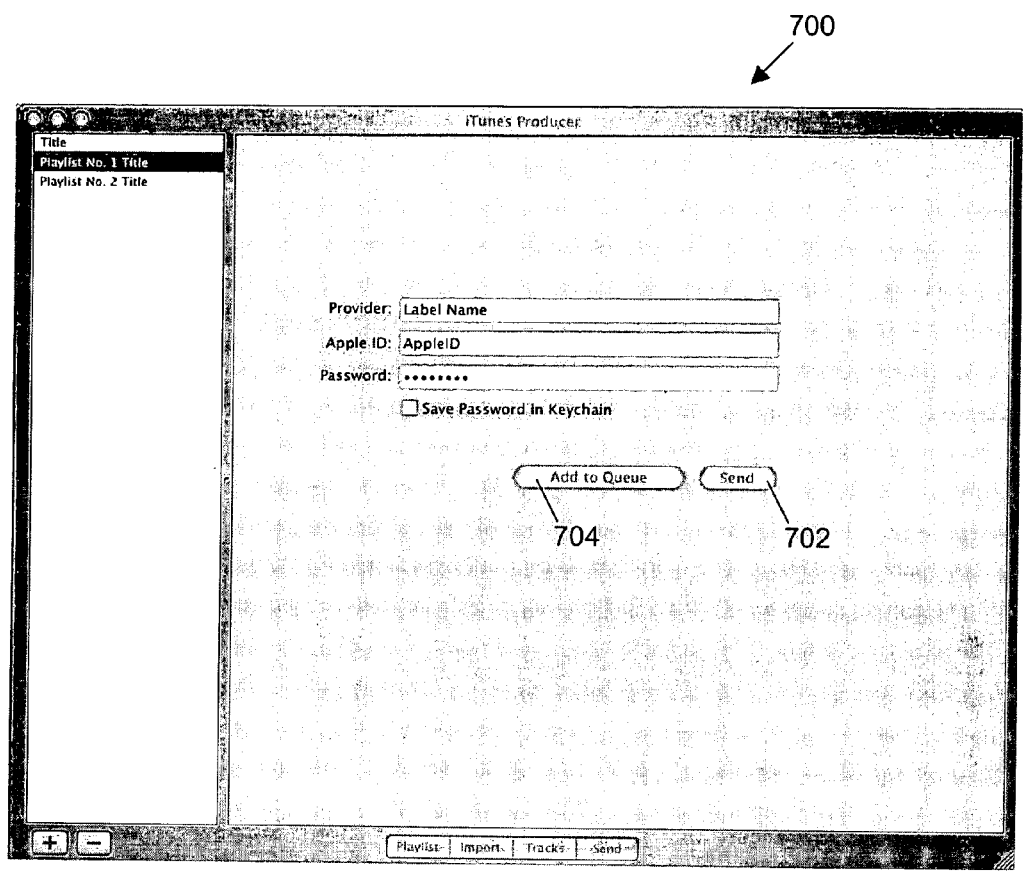
FIG. 7 is a screenshot of a representative folder send window according to one embodiment of the invention.

FIG. 7 is a screenshot of a representative folder send window 700 according to one embodiment of the invention. The folder send window 700 allows the user to identify the provider of the media collection (such as the name or producer of the music label), the account identifier associated with the provider (user), and a password. Additionally, the folder send window 700 enables the user to either submit the media collection (e.g., playlist) that has been assembled to the media distribution site 102 by a "Send" button 702, or to defer submission by an "Add to Queue" button 704.

Figure 8:
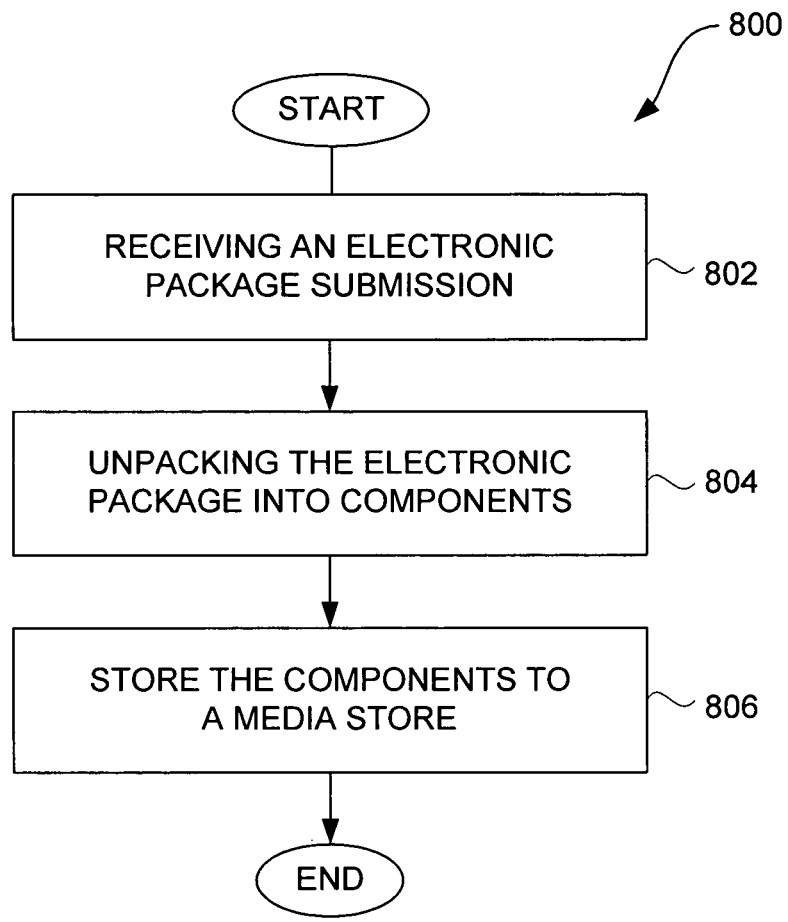
FIG. 8 is a flow diagram of a media reception process according to one embodiment of the invention.

FIG. 8 is a flow diagram of a media reception process 800 according to one embodiment of the invention. The media reception process 800 is typically performed by a server machine, namely, a media distribution site, such as the media distribution site 102 illustrated in FIG. 1.

The media reception process 800 initially receives 802 an electronic package submission. As previously noted, the electronic package submission would be received 802 at a media distribution site (e.g., the media distribution site 102). Then, the electronic package (e.g., electronic folder) is unpacked 804 into its various components. The unpacking 804 can involve obtaining the various media files and metadata from the electronic package. The metadata is typically provided within a text file. The text file can include organizational information as well as descriptive information for the media content. The organizational information can specify what components are provided within the electronic package. Hence, the unpacking 804 can include parsing of the text file to acquire not only the descriptive information but also the organizational information. In one embodiment, the text file is provided in a markup language (e.g., XML) and thus can be parsed using a markup language parser. Following the unpacking 804, the components of the electronic package can be stored 806 to a media store (e.g., media store 103). The media reception process 800 is then complete and ends. Following the media reception process 800, the media distribution site is able to render the media collection available for purchase online. For example, the media can be purchased online through a music site that is accessible by client machines through the Internet.

FIG. 9 is a screenshot of a representative text file 900 in a markup language format according to one embodiment of the invention. In particular, the markup language format can, for example, be XML. The text file 900 has a header region 902, a media collection metadata region 904 with an artwork portion 906, a media item metadata region 908, and a media content region 910. The header region 902 identifies an electronic package, a tool used to produce the electronic package, and its provider. The media collection metadata region 904 contains playlist or album metadata. The artwork portion 906 indicates an image file and MD5 message digest that serves as a digital signature for the image file. The media item metadata region 908 provides metadata for each of the media items in the electronic package (e.g., track metadata). The media content region 910 indicates a media file (e.g., audio track file) and a MD5 message digest that serves as a digital signature for the media file.

The various aspects, features, embodiments or implementations of the invention described above can be used alone or in various combinations.

The media items can pertain to audio items (e.g., audio files or songs, such as for music), video items (e.g., video files or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable media include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that submission of media to online media hosting sites can be achieved with uniformity. The uniformity eases the burden on representatives of the online media hosting sites to process the media submissions. Another advantage of the invention is that media submissions can be processed in an automated manner.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for submission of a media collection from a client machine to a media distribution server machine, said method comprising:
    obtaining metadata for a media collection;
    identifying media content for a plurality of media items to be included in the media collection, the media content being imported from a media source, each of the media items including a different audio track;
    converting the identified media content for the plurality of media items into compressed media files, said converting encodes the media content for each of the media items into a compressed audio format;
    obtaining metadata for the identified media content;
    forming, at the client machine, an electronic package of the media collection, the electronic package including at least the compressed media files and the metadata associated with the media collection and the identified media content; and
    thereafter electronically transmitting the electronic package from the client machine to the media distribution server machine, thereby submitting the media collection to the media distribution server machine for subsequent distribution,
    wherein the electronic package of the media collection comprises a plurality of electronic files, one of the electronic files is a markup language file containing at least the metadata, another of the files is an image file for artwork associated with the media collection, and a plurality of other of the files are compressed audio files,
    wherein the metadata provided for the media collection includes at least media collection metadata as well as media item metadata, the media item metadata being provided for each of the media items within the media collection, and
    wherein the electronic package further includes a digital signature for each of the compressed audio files, and includes a digital signature for the image file.

2. A method as recited in claim 1, wherein the metadata for the media collection obtained includes at least descriptive media collection information.

3. A method as recited in claim 2, wherein the descriptive media collection information includes, for the media collection, at least a title, an artist, a genre, a label name, copyright information, release information, and a numerical identifier.

4. A method as recited in claim 3, wherein the descriptive media collection information further includes an image to be used as artwork for the media collection.

5. A method as recited in claim 1, wherein the metadata for the media collection is entered by a user.

6. A method as recited in claim 1, wherein the audio tracks included in the media collection pertain to songs, and
    wherein said converting encodes the media content for each of the songs into a compressed audio format.

7. A method as recited in claim 6, wherein the compressed audio format is MPEG based.

8. A method as recited in claim 6, wherein the compressed audio format is MPEG4 based.

9. A method as recited in claim 6, wherein the compressed audio format is Advanced Audio Coding (AAC).

10. A method as recited in claim 6, wherein the compressed audio format is MP4, M4 or M4a.

11. A method as recited in claim 1, wherein at least one of the media items is a multimedia item.

12. A method as recited in claim 1, wherein the metadata for the identified media content includes at least descriptive media item information for each of the media items of the identified media content.

13. A method as recited in claim 12, wherein the descriptive media item information includes, for the corresponding media item, at least a title, an artist, a genre, track number, a label name, copyright information, and a numerical identifier.

14. A method as recited in claim 13, wherein the descriptive media item information further includes an indication as to whether the identified media content is available for sale.

15. A method as recited in claim 14, wherein the descriptive media item information further includes a parental advisory.

16. A method as recited in claim 1, wherein the metadata for the identified media content is entered by a user.

17. A method as recited in claim 1, wherein a first portion of the metadata for the identified media content is obtained from the metadata for the media collection.

18. A method as recited in claim 1, wherein a second portion of the metadata for the identified media content is entered by a user.

19. A method as recited in claim 1, wherein the metadata for the identified media content includes an indication as to whether the identified media content is available for sale.

20. A method as recited in claim 1, wherein the metadata for the imported media content includes a parental advisory.

21. A method as recited in claim 1, wherein the digital signature for the image file for artwork associated with the media collection is a MD5 message digest, and wherein the digital signatures for the compressed audio files are MD5 message digests.

22. A method as recited in claim 21, wherein the markup language file is an XML file, the image file is a JPEG file, and the compressed audio files are MPEG4 based.

23. A method as recited in claim 1, wherein said transmitting operates to electronically transmit the electronic package to the media distribution server machine over the Internet using encryption.

24. A method as recited in claim 1, wherein said method further comprises:
receiving the electronic package at the media distribution server machine;
parsing the electronic package to retrieve components from the electronic package, the components including at least the identified media content in the compressed media format, the metadata for the media collection and the metadata for the at least one media item; and
storing the components into a media distribution database.

25. A method as recited in claim 24, wherein said method further comprises:
rendering the media collection and the media items thereof available for online purchase at the media distribution server machine.

26. A method as recited in claim 1, wherein said method further comprises:
rendering the media collection and the media items thereof available for online purchase at the media distribution server machine.

27. A method as recited in claim 1, wherein said method is performed by an application program.

28. A method as recited in claim 27, wherein, when the application program performs said obtaining of the metadata for the media collection and said obtaining of the metadata for the identified media content, a user interacts with the application program.

29. A method as recited in claim 28, wherein the user is a representative for an independent recording label, and wherein said application program facilitates the independent recording label in submission of the media collection to the media distribution server machine for subsequent online distribution.

30. A method as recited in claim 1, wherein said transmitting is from the client machine to the media distribution server machine, and wherein said transmitting comprises:
receiving a submission input from a user of the client machine;
determining, based on the submission input, whether the electronic package should be transmitted or queued;
queuing the electronic package when said determining determines that the electronic package should be queued; and
transmitting the electronic package to the media distribution server machine when said determining determines that the electronic package should be transmitted.

31. A computer readable storage medium including at least computer program code for submission of a media collection to a media distribution site, said computer readable storage medium comprising:
computer program code for identifying media content for a plurality of media items to be included in the media collection, the media content being imported from a media source, each of the media items including a different audio track;
computer program code for converting the identified media content for the plurality of media items into compressed media files, said computer program code for converting encodes the media content for each of the media items into a compressed audio format;
computer program code for obtaining metadata for the identified media content;
computer program code for forming an electronic package of the media collection, the electronic package including at least the compressed media files and the metadata associated with the identified media content; and
computer program code for electronically transmitting the electronic package to the media distribution site, thereby submitting the media collection to the media distribution site for subsequent distribution,
wherein the electronic package of the media collection comprises a plurality of electronic files, one of the electronic files is a markup language file containing at least the metadata, another of the files is an image file for artwork associated with the media collection, and a plurality of other of the files are compressed audio files,
wherein the metadata provided for the media collection includes at least media collection metadata as well as media item metadata, the media item metadata being provided for each of the media items within the media collection, and
wherein the electronic package further includes a digital signature for each of the compressed audio files, and includes a digital signature for the image file.

32. A computer readable storage medium as recited in claim 31, wherein the electronic package comprises a folder including the plurality of electronic files.

33. A computer readable storage medium as recited in claim 31, wherein said computer code for identifying the media content operates to assist a user in identifying the media content.

34. A computer readable storage medium as recited in claim 31, wherein the media source is a compact disc.

35. A computer readable storage medium as recited in claim 31, wherein the metadata is provided by a user.

36. A computer readable storage medium as recited in claim 35, wherein the metadata for the identified media content includes an indication as to whether the identified media content is available for sale.

37. A computer readable storage medium as recited in claim 31, wherein the metadata for the identified media content includes a parental advisory indication.

38. A computer readable storage medium as recited in claim 31, wherein the media distribution site is an online media distribution site.

39. A computer readable storage medium as recited in claim 31, wherein said computer program code for electronically transmitting operates to electronically transmit the electronic package to the media distribution site over the Internet using encryption.

40. A computer readable storage medium as recited in claim 31, wherein the metadata identifies artwork associated with the media collection or the identified media content, and
wherein the digital signature for the image file is a MD5 message digest and wherein the digest signatures for the compressed media files are MD5 message digests.

41. A computer readable storage medium as recited in claim 40, wherein the markup language file is an XML file, the image file is a JPEG file, and the compressed media files are MPEG4 based.

42. A computer readable storage medium as recited in claim 31, wherein said computer program code for transmitting transmits the electronic package from a client machine to the media distribution site, and wherein said computer program code for electronically transmitting comprises:
computer program code for receiving a submission input from a user of the client machine;

computer program code for determining whether the electronic package should be transmitted or queued based on the submission input;

computer program code for queuing the electronic package when said computer program code for determining determines that the electronic package should be queued; and computer program code for transmitting the electronic package to the media distribution site when said computer program code for determining determines that the electronic package should be transmitted.

43. A computer readable storage medium as recited in claim 42, wherein said computer program code for electronically transmitting further comprises:

computer program code for encrypting at least a portion of the electronic package prior to transmission to the media distribution site.

44. A computer readable storage medium as recited in claim 31, wherein said computer readable storage medium further comprises:

computer program code for rendering the media collection and the media items thereof available for online purchase at the media distribution site.

45. A computer readable storage medium as recited in claim 31, wherein said computer readable storage medium facilitates an independent recording label with submission of the media collection to the media distribution site for subsequent online distribution.

46. A method for submission of a media collection from a client machine to a media distribution site, the client machine configured for operation by a user, said method comprising:

receiving, at the client machine, metadata for a media collection;

identifying, at the client machine, media content for a plurality of media items to be included in the media collection, the media content being imported from a media source, each of the media items including a different audio track;

converting, at the client machine, the identified media content for the plurality of media items into compressed media files, said converting encodes the media content for each of the media items into a compressed audio format;

receiving, at the client machine, metadata for the identified media content;

forming, at the client machine, an electronic package of the media collection, the electronic package including at least the compressed media files and the metadata associated with the media collection and the identified media content; and thereafter electronically transmitting the electronic package from the client machine to the media distribution site, thereby submitting the media collection to the media distribution site for subsequent distribution, wherein the electronic package of the media collection comprises a folder of files, one of the files is a markup language file containing at least the metadata, another of the files is an image file for artwork associated with the media collection, and a plurality of other of the files are compressed audio files, wherein the electronic package of the media collection comprises a folder of electronic files, one of the electronic files is a markup language file containing at least the metadata, another of the files is an image file for artwork associated with the media collection, and a plurality of other of the files are compressed audio files, wherein the metadata provided for the media collection includes at least media collection metadata as well as media item metadata, the media item metadata being provided for each of the media items within the media collection, and wherein the electronic package further includes a digital signature for each of the compressed audio files, and includes a digital signature for the image file.

* * * * *